Patented Sept. 7, 1937

2,092,058

UNITED STATES PATENT OFFICE 2,092,058

FIELD COIL FOR MOTORS

Ralph E. Ferris, Wilkinsburg, Pa., assignor to Westinghouse Electric & Manufacturing Company, East Pittsburgh, Pa., a corporation of Pennsylvania Application November 28, 1936, Serial No. 113,176

2 Claims. (Cl. 171—252)

My invention relates to field-coils for salient-pole dynamo-electric machines, and it has particular relation to special-configuration field-coils for driving or traction motors for railway and motor-coach service.

An object of the invention is to conserve the available space between the armature and the field-frame or yoke of a direct-current traction motor, so as to make it possible to reduce the radial extent of this space, thus bringing the field-frame closer to the armature and reducing the size and weight of the motor, while at the same time causing the field-coils to fit more closely against the field-frame member so as to avoid dead-air pockets and to facilitate the transfer of heat from the coil to the frame-member.

The conservation of traction-motor weight, or the ability to obtain the same or greater horse power out of a lighter weight of motor, is an extremely important item in all self-propelled vehicles, and particularly in buses such as trolley buses, where the vertical space available underneath the floor of the vehicle is limited, so that a reduction in the size of the motor may make the difference between a two-motor bus and a single-motor bus. Furthermore, the difference between a two-motor bus and a single-motor bus may be that the single-motor bus is so similar to a gasoline-driven bus that it may be produced on the same manufacturing "line" as a gasoline-driven bus, whereas the two-motor bus cannot be manufactured in this way because it is so special.

The particular object of my invention is to make a field coil, utilizing wedge-shaped strap-copper or tapered copper straps, whereby the coil as a whole nests snugly against the inner surface of the cylindrical frame-member substantially without dead-air spaces, and whereby the coil as a whole tapers down, in cross-section, from a maximum width at its outer periphery to a minimum width at its inner periphery, thereby more completely utilizing the available space between the armature and the cylindrical frame-member of the motor.

In the accompanying drawing, the single figure of which is a somewhat diagrammatic fragmentary cross-sectional view of a motor embodying my invention in a preferred form, the motor comprises a salient-pole stator-member which is made up of a magnetizable cylindrical frame or yoke-member 2, salient magnetizable main-pole and commutating-pole, members 3 and 4, main field coils 5, and commutating pole coils 6. The motor also has an armature member, the outer periphery of which is indicated at 7.

According to my invention, at least some of the field-coil members, either the main field-coils 5 or the commutating field-coils 6, or both of them, are specially constructed in order to conserve space and to facilitate heat-transfer from the coils to the cylindrical frame member 2.

In the particular embodiment of my invention shown in the drawing, the main field-coils 5 are specially constructed, being wound with wedge-shaped conducting straps 8, that is, with copper straps having a tapered cross-section, the wide end of the cross-section being toward the cylindrical frame-member 2. Each of the conducting straps is provided with a light insulation 9, so as to insulate the several turns from each other, and the whole coil is provided with a thicker outside insulation 10 for the purpose of insulating the coil from the magnetizable frame-parts 2 and 3.

It will be perceived that the utilization of wedge-shaped conducting straps 8 causes the outer periphery of the coil to be curved, so as to fit snugly against the inner surface of the cylindrical frame-member 2, thereby fully utilizing all of the available space, so as to reduce the size of the motor, while at the same time avoiding the presence of a dead-air space between the said outer periphery of the coil 5 and the inner periphery of the cylindrical frame-member 2, thereby facilitating heat-transfer from the coil to the frame, and thus still further reducing the size of the motor for a given output.

Preferably each of the pole-pieces 3 carrying my improved field-coils is provided with a plurality of coils 12 and 13, each coil being composed of a single layer of the wedge-shaped copper straps 8. The outer coil 12 thus nests snugly against the inner surface of the cylindrical frame-member 2 as described, and the inner coil 13 rests snugly against the inner periphery of the outer coil, with insulation 14 therebetween. In this form of construction, the inner coil has a smaller number of turns than the outer coil, but the same size of copper strap, so that the maximum width of the inner coil will be about the same as the minimum width of the outer coil, thus causing the outer configuration of the two coils as a whole to be a tapered or trapezoidal-shaped configuration, effectively utilizing the available space of the stator-member of the motor. Usually, the two coils will be bound together in a single unit by means of a single encompassing outer insulating covering 10.

I claim as my invention:

1. A salient-pole stator-member for a dynamo-electric machine characterized by a cylindrical frame-member, salient-pole members extending inwardly therefrom, and coils disposed on certain of the salient-pole members, each of said coils comprising a plurality of turns of wedge-shaped conducting straps suitably insulated from adjacent turns and from the frame and pole-members, whereby each coil as a whole nests snugly against the inner surface of the cylindrical frame substantially without dead-air spaces.

2. A salient-pole stator member for a dynamo-electric machine characterized by a cylindrical frame-member, salient-pole members extending inwardly therefrom, and coils disposed on certain of the salient-pole members, each of said certain pole-members carrying a plurality of coils, one coil being disposed against the inner surface of the cylindrical frame-member, and another coil being disposed against the opposite side of the first-mentioned coil, each of said coils comprising a plurality of turns of wedge-shaped conducting straps suitably insulated from adjacent turns and from the frame and pole-members, whereby the first-mentioned coil nests snugly against the inner surface of the cylindrical frame substantially without dead-air spaces, and whereby the second-mentioned coil nests snugly against the inner side of the first-mentioned coil, the second-mentioned coil having a smaller number of turns than the first-mentioned coil whereby the available space of the motor is more effectively utilized.

RALPH E. FERRIS.

Patented Sept. 7, 1937

2,092,059

UNITED STATES PATENT OFFICE 2,092,059

PROCESS OF AND CATALYST FOR OXIDIZING COMBUSTIBLE GASES

Joseph C. W. Frazer, Baltimore, Md.

No Drawing. Application March 9, 1934, Serial No. 714,829

10 Claims. (Cl. 23—2)

This invention relates to the catalytic oxidation of combustible, or oxidizable, gases and vapors.

While the invention is applicable to catalytic oxidation of combustible gases and vapors generally, it is especially applicable to the catalytic oxidation of carbon monoxide, and particularly to the treatment of exhaust gases from internal combustion engines to effect combustion of the carbon monoxide and other combustible constituents, and therefore it may be so described herein by way of example.

The extremely severe conditions which prevail in catalytic oxidation of carbon monoxide contained in the exhaust gases from internal combustion engines set unusually severe criteria for such catalysts. In addition to containing relatively large amounts of this toxic constituent (carbon monoxide) these gases contain also large amounts of other combustibles, such as unburned gasoline and oil, and products resulting from their decomposition or partial combustion. Experience has shown that the carbon monoxide in such gas mixtures can not be oxidized selectively, but that all of the combustibles are burned in completely converting the carbon monoxide to carbon dioxide. In consequence, very large amounts of heat are liberated in effecting the catalytic combustion of the carbon monoxide in internal combustion engine exhaust gases. These gases also contain water vapor, and this, together with oil and the like, generally tends to reduce the efficiency of catalysts. Therefore, to be effective for this purpose, the catalysts must be capable of continuous high activity at elevated temperatures in the presence of the materials referred to.

A further requirement of such catalysts is that they shall be capable of continuous and complete oxidation of the combustibles in these gases after being repeatedly cooled from and reheated to such temperatures. That is, internal combustion engines usually are not operated continuously, and hence the catalysts must be capable of efficient operation when used intermittently, i. e., each time the engine is run, whether such intermittent operation be of but a few minutes or of many hours duration.

In addition to the foregoing requirements, practical considerations render it desirable also that these catalysts possess a relatively low starting temperature, in order to avoid the use of accessory catalyst heating devices which would otherwise be necessary. Ideally the catalysts should be capable of initiating and continuing combustion of the combustible constituents in these gases upon being heated only by the gases supplied to them. For the same reason the starting temperature should remain constant, or substantially so, after long continued use, whether continuous or intermittent.

In my U. S. Patent No. 1,789,812, issued January 20, 1930, I have disclosed and claimed a method of treating these gases to eliminate their combustible constituents by subjecting them, admixed with an oxygen-containing gas, e. g., air, to the action of an artificially prepared chromite, and specifically iron chromite. Actual tests with automobiles have shown that the iron chromites disclosed therein operate perfectly satisfactorily for the purpose of and in the manner described in the patent. It has been found, however, that after extended use their starting temperature may be about 400° C., and therefore means other than the heat of the raw gases is needed to bring them to starting temperature. Hence, while the iron chromites referred to in my aforesaid patent fully meet the main requirements of a catalyst for this use, being capable of completely oxidizing the combustibles in the gases for an indefinite period of time, and are accordingly fully operative and capable of satisfactory use, they lack the ancillary desideratum of continuously maintained low starting temperature.

It is among the objects of the present invention to provide a method of catalytically and completely oxidizing combustible gases and vapors, including carbon monoxide, and especially in internal combustion engine exhaust gases, in which the oxidation may be effected at relatively low temperatures, and further to provide oxidation catalysts for the practice of such a method and which are capable of sustained use at elevated temperatures, particularly for effecting complete oxidation of the combustible constituents of internal combustion engine exhaust gases, which possess unusually low and substantially constant starting temperatures, and which are inexpensive, easily prepared, highly active, capable of functioning in the presence of water vapor, and remain efficient over long periods of time when used either continuously or intermittently.

A further object is to provide a method of making catalysts of the type just referred to which is simple, readily performed, and is adapted to provide supported and non-supported catalysts.

I have discovered, and it is upon this that my invention is predicated, that its stated objects are attained by the use of catalysts comprising metallic chromites, as disclosed in my aforesaid patent, intimately admixed with metallic silver. The chromite catalysts contemplated herein may be prepared simply and readily by thermal reduction of copper chromates, and the silver may be introduced readily. These catalysts satisfactorily fulfill the requirements of catalysts for treating internal combustion engine exhaust gases, and they possess all of the valuable characteristics of chromite catalysts. In addition the use of metallic silver confers unexpected and unusually low starting temperatures. Moreover, the starting temperature does not rise unduly with continued use.

Although various metallic chromites, such as those described in my aforesaid patent, may be used in the practice of the present invention, its preferred embodiment resides in copper chromites, which may therefore be taken as exemplary for further detailed description. Having reference thereto, experience has shown that the starting temperatures of copper chromite catalysts containing silver (as provided by this invention) are low enough to adapt them to be heated sufficiently by internal combustion engine exhaust gases to cause them to function, without external heating. This characteristic, combined with their other properties, renders the catalysts of this invention especially suited for elimination of combustible constituents from exhaust gases of internal combustion engines.

Various copper chromites may be used in the practice of this invention, and they may be made in various ways, as described in a copending application Serial No. 546,928, filed by me on June 25, 1931, now Patent No. 2,031,475, granted February 18, 1936, of which this application is a continuation-in-part. For instance, a chromite suitable for the preparation of a catalyst according to the present invention may be prepared from a reaction product of copper hydroxide and chromic acid in proportions corresponding to copper chromate. I have found that copper hydroxide dissolves readily in aqueous solutions of chromic acid to form a solution of an oxygen compound of copper and chromium which upon being evaporated and heated is apparently converted to a catalytically active copper chromite. Apparently an acid copper chromate is formed, and this is then reduced to chromite, although I do not limit myself by this supposition. Copper carbonate may be used also, instead of the hydroxide.

The copper hydroxide or carbonate dissolves particularly readily if in a freshly precipitated condition. In the preferred embodiment the cupric compound is used, the chromite being formed by evaporation of the solution to dryness, and heating the residue, preferably by ignition at about 1000° to 1100° C. The dried residue is then broken up to provide granules of the copper chromite.

Preferably, however, supported catalysts are used in the practice of this invention. They may be prepared, for example, by immersing a suitable support in the chromate solution, and drying and heating the wetted support. For instance, one type of supported catalyst may thus be prepared by immersing a metallic screen in the solution, draining the excess solution therefrom, and heating the thus wetted screen. This provides the catalysts in the form of thin films which adhere tenaciously to the underlying metallic support.

More suitably, however, a porous granular material is used to prepare supported catalysts. A variety of suitable supporting materials are available and known to those skilled in the art. For use with internal combustion engines, however, I have found that alumina in an activated condition sold under the name "Hydralo" is outstanding in this regard. Not only is it highly porous, to provide a large surface exposure, but its other physical and mechanical properties render it especially desirable as a support for the particular application referred to.

As a specific example of the preparation of these chromites, there may be described the preparation of what appears to be cupric meta-chromite. To this end, one mol. of cupric hydroxide (or carbonate) is reacted with two mols of chromium trioxide in aqueous solution. For example, 296 grams of hydrated copper nitrate $$[Cu(NO_3)_2 \cdot 6H_2O]$$

dissolved in a large excess of water are precipitated with half-strength ammonia, and to the resultant suspension of cupric hydroxide there is added sufficient chromic anhydride, preferably in concentrated aqueous solution, to form cupric chromate. Preferably the acid chromate, $Cu(HCrO_4)_2$, is formed, and accordingly a solution of 200 grams of chromic anhydride $(CrO_3)$ in sufficient water to dissolve it is added to the copper hydroxide suspension. Upon vigorous stirring the copper hydroxide dissolves rapidly, forming a deep red solution, which is evaporated to dryness and heated, as described hereinabove.

Actual tests of copper chromite prepared in this manner have shown it to be a good oxidation catalyst, and to possess properties which make it a desirable catalyst for the treatment of internal combustion engine exhaust gases. Thus such catalysts when new begin to function at about 280° C. Tests have shown, however, that often with very long use, e. g. 1200 to 1500 hours, their starting temperatures increase somewhat, although they continue to function at 100 per cent efficiency and apparently will do so indefinitely. The increase in starting temperature may be disadvantageous for some purposes, such as treating exhaust gases from automotive vehicles.

In accordance with the present invention the drawback just mentioned is satisfactorily overcome, while retaining the desirable properties of the catalysts, by incorporating free silver in the chromite catalyst. Thereby the starting temperature may be decreased to about 160° to 170° C., and extended use has shown that these silver-containing catalysts are resistant to thermal influences. Thus, after nearly 400 hours' total use with exhaust gases from intermittently operated standard internal combustion engines, these catalysts (with silver) show a starting temperature of but 225° C., which is more than fifty degrees centigrade below the initial starting temperature of the simple copper chromite. Wide experience with chromite catalysts has shown that after 300 to 400 hours of use no further material increase in starting temperature will occur. This difference is very substantial and is especially beneficial in connection with internal combustion engine exhaust gas treatment. So for all practical purposes the catalysts of this invention have and retain lower starting temperatures than the catalysts known heretofore for this purpose.

Very small amounts of silver suffice for the purposes of the invention. Apparently the silver acts as a promoter for the chromite. It may be introduced in various ways, the chief desideratum